(12) United States Patent
Shashidhar et al.

(10) Patent No.: US 7,684,522 B2
(45) Date of Patent: Mar. 23, 2010

(54) METHOD AND SYSTEM FOR DETERMINING A LOG-LIKELIHOOD RATIO (LLR) CORRESPONDING TO EACH BIT OF A SYMBOL

(75) Inventors: Vummintala Shashidhar, Santa Clara, CA (US); Sreenath Ramanath, Santa Clara, CA (US); Balaji Sundar Rajan, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 1007 days.

(21) Appl. No.: 11/374,705

(22) Filed: Mar. 14, 2006

(65) Prior Publication Data
US 2007/0030925 A1     Feb. 8, 2007

(30) Foreign Application Priority Data
Aug. 2, 2005    (IN) .................... 888/MUM/2005

(51) Int. Cl.
*H04L 27/06* (2006.01)
(52) U.S. Cl. .................... 375/340; 375/316; 375/324
(58) Field of Classification Search ................ 375/316, 375/324, 340
See application file for complete search history.

(56) References Cited

U.S. PATENT DOCUMENTS

| | | | | |
|---|---|---|---|---|
| 7,154,961 B2* | 12/2006 | Wengerter et al. | ........... | 375/267 |
| 7,218,689 B2* | 5/2007 | Gupta | ........................ | 375/340 |
| 7,349,496 B2* | 3/2008 | Jia et al. | ..................... | 375/341 |
| 2003/0185310 A1* | 10/2003 | Ketchum et al. | ............. | 375/259 |
| 2005/0141644 A1* | 6/2005 | Sadowsky | .................... | 375/324 |
| 2005/0259765 A1* | 11/2005 | Keller et al. | ................. | 375/322 |
| 2008/0192851 A1* | 8/2008 | Elbwart et al. | .............. | 375/261 |

* cited by examiner

*Primary Examiner*—David C Payne
*Assistant Examiner*—Leon Flores

(57) ABSTRACT

Methods and systems for determining a Log-Likelihood Ratio (LLR) corresponding to each bit of a symbol are provided. The symbol comprises a predefined number of bits based on a predetermined constellation. The methods and systems include expanding the predetermined constellation. The predetermined constellation comprises a plurality of constellation-points wherein each constellation-point has a unique X co-ordinate and Y co-ordinate. Also, the expanded predetermined constellation further comprises points corresponding to each combination of the X co-ordinate and the Y co-ordinate of the constellation-points. The methods and systems further include calculating the LLR corresponding to each bit of the symbol based on the expanded predetermined constellation.

15 Claims, 5 Drawing Sheets

METHOD AND SYSTEM FOR DETERMINING A LOG-LIKELIHOOD RATIO (LLR) CORRESPONDING TO EACH BIT OF A SYMBOL

RELATED APPLICATION DATA

This application claims the priority date of Indian Provisional Application Serial No. 888/MUM/2005 filed on Aug. 2, 2005 entitled "METHOD AND SYSTEM FOR COMPUTING A LOG-LIKELIHOOD RATIO (LLR) Corresponding To Each Bit Of A Symbol".

BACKGROUND OF THE INVENTION

The invention generally relates to communication systems. More specifically, the invention relates to a method and system for determining a Log-Likelihood Ratio (LLR) corresponding to each bit of a symbol in a predetermined constellation.

LLR is generally determined to decode the raw bits. For example, LLR can be determined to decode the raw bits in a forward error correction technique so as to improve the system performance.

In known communication systems that employ a regular Quadrature Amplitude Modulation (QAM) constellation, the complexity of computing the LLRs can be reduced to a few arithmetic operations, such as addition and multiplication. These communication systems also employ rotated QAM constellation and pre-coded QAM to achieve full-diversity and/or to maximize coding gain. The method of determining LLR for a rotated QAM constellation and pre-coded QAM constellation is however, computationally intensive.

There is therefore a need for a method and system that reduces the computations involved in determining a LLR for predetermined constellations such as rotated QAM constellation and pre-coded QAM constellation.

SUMMARY

Embodiments described below provide a method and system in which the computations involved in determining a Log-Likelihood Ratio (LLR) are significantly reduced for predetermined constellations such as a rotated QAM constellation and a pre-coded QAM constellation.

In order to fulfill the above-mentioned object, a method and system for determining an LLR corresponding to each bit of a symbol is provided in the embodiments below. The symbol comprises a predefined number of bits based on a predetermined constellation. The method includes expanding the predetermined constellation. The predetermined constellation comprises a plurality of constellation-points wherein each constellation-point has a unique X co-ordinate and Y co-ordinate. Also, the expanded predetermined constellation further comprises points corresponding to each combination of the X co-ordinate and the Y co-ordinate of the constellation-points. The method further includes calculating the LLR corresponding to each bit of the symbol based on the expanded predetermined constellation.

BRIEF DESCRIPTION OF DRAWINGS

A more complete appreciation of the present invention will become readily apparent as the same becomes better understood by reference of the following detailed description when considered in conjunction with the accompanying drawings in which reference symbols indicate the same or similar components, wherein.

DETAILED DESCRIPTION OF DRAWINGS

The embodiments described herein provide methods and systems for determining a Log-Likelihood Ratio (LLR) corresponding to each bit of a symbol. LLR generally refers to a natural logarithmic function of the ratio of the probability of the value of a bit equal to one to the probability of the value of the bit equal to zero.

Figure 1:
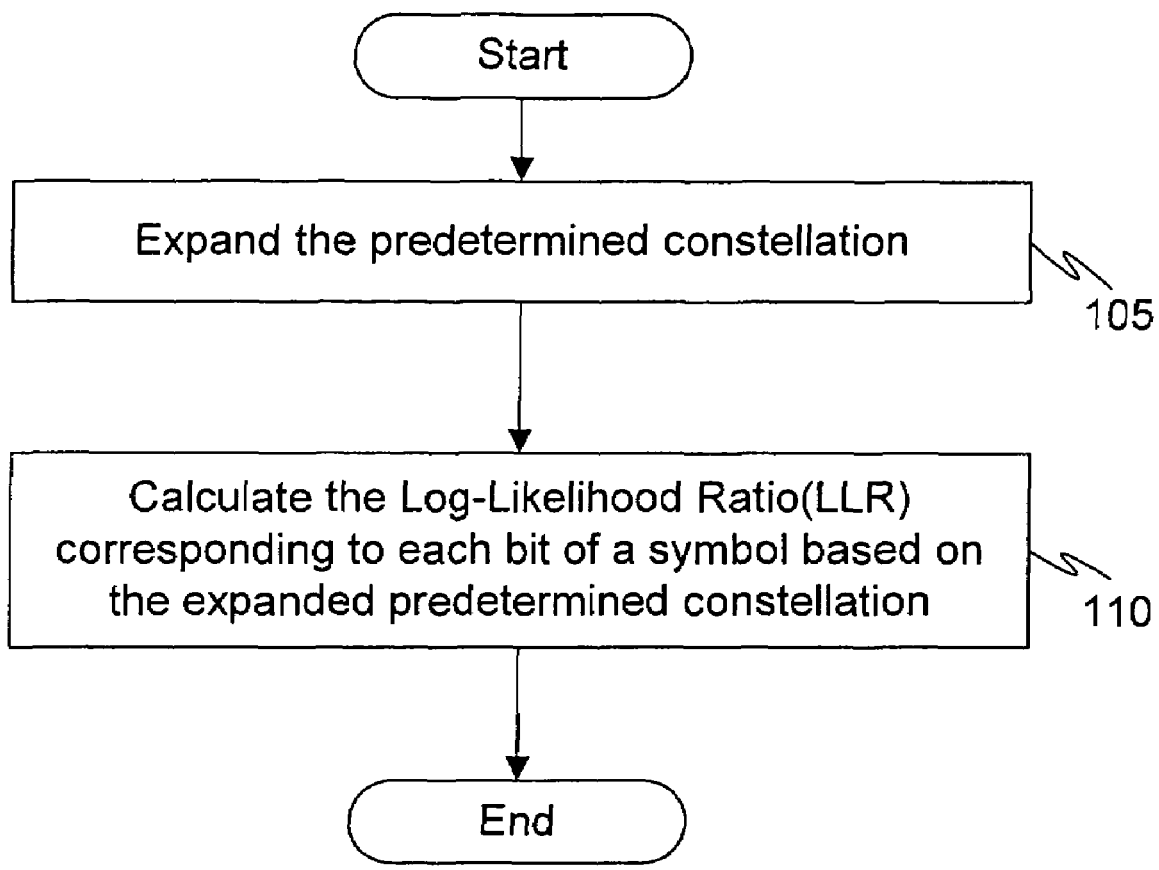
FIG. 1 is a flowchart for determining a Log-Likelihood Ratio (LLR) corresponding to each bit of a symbol, in accordance with an embodiment of the invention.

FIG. 1 is a flowchart for determining a LLR corresponding to each bit of a symbol, in accordance with an embodiment. The symbol represents a predefined number of bits based on a predetermined constellation. In various embodiments, the predetermined constellation includes a plurality of constellation-points. Each constellation-point has a unique X co-ordinate and Y-co-ordinate.

In an embodiment, the predetermined constellation is a rotated Quadrature Amplitude Modulation (QAM) constellation generated by a finite non-zero rotation. A sequence of information bits is transmitted by transmitting the corresponding sequence of symbols labeled by these constellation-points. In an embodiment, the X co-ordinate and the Y co-ordinate of a pair of constellation-points are interleaved. For example, using a first symbol, $s_0 = R(s_0) + jI(s_0)$ and a second symbol, $s_1 = R(s_1) + jI(s_1)$, the interleaved symbols are $x_0 = R(s_0) + jI(s_1)$ and $x_1 = R(s_1) + jI(s_0)$.

In another embodiment, the predetermined constellation is a pre-coded QAM constellation. Further, the constellation-points on the constellation of the pre-coded QAM constellation satisfy at least one predefined condition. In an embodiment, a predefined condition is that a first constellation-point of the pre-coded QAM is equal to the complex conjugate of a second constellation-point. The complex conjugate may be a positive conjugate or a negative of the positive conjugate. In another embodiment, a predefined condition is that the X co-ordinate of a symbol point is selected from a first set and the Y co-ordinate of the symbol point is selected from a second set such that the second set is a complement of the first set. In yet another embodiment, a predefined combination may be a combination of the predefined conditions discussed above. For example, for predetermined constellations which are equal to a Cartesian product of two real vectors, i.e., $S = R(S) \times I(S)$, predefined conditions can be: (1) there exists a subset $A \subset \{0,1\}^N$ such that $f(A) = R(S)$ and $f(A) = I(S)$, where $A \equiv \{0,1\}^K$ for $K \in [0, N-1]$, k is a bit position, and $f: \{0,1\}^N \to S$ (2) $S_{0,k} = S^*_{1,k}$ or $S_{0,k} = -S^*_{1,k}$ for all $k \in [0, N-1]$ depending on whether k is associated with the set A or its complement respectively.

At 105, the predetermined constellation is expanded where the expanded predetermined constellation includes each constellation-point of the predetermined constellation and points corresponding to each combination of the X co-ordinate and the Y co-ordinate of the constellation-points of the predetermined constellation. For example, a combination of the X co-ordinate and the Y co-ordinate of a constellation-point can be a product of projections of the constellation-point. This is further explained below in conjunction with FIG. 2.

In an embodiment, the number of expanded-constellation-bits is equal to twice the predefined number of bits, if the predetermined constellation is a rotated QAM constellation. For example, the predefined number of bits to represent a constellation-point on a rotated 4-QAM constellation is equal to two and the number of expanded-constellation-bits to represent a point on the expanded 4-QAM constellation is equal to four.

In another embodiment, the number of expanded-constellation-bits is equal to the product of the predefined number of bits and number of pre-coded constellation-points, if the predetermined constellation is a pre-coded QAM constellation. The pre-coded QAM constellation depends on the number of symbols to be pre-coded and a unitary matrix (also termed as constellation pre-coder). For example, if the input constellation is a regular 4-QAM constellation and, $$U = \begin{pmatrix} 1/sqrt(2) & 1/sqrt2 \\ 1/sqrt2 & -1/sqrt2 \end{pmatrix}$$

(where, U is a pre-coder) then, the constellation pre-coded 2-tuples corresponding to 2-tuples over the regular 4-QAM constellation are:

$(-1+j1,-1+j1) \rightarrow (-\sqrt{2}+j\sqrt{2},0)$ $(-1-j1,-1+j1) \rightarrow (-\sqrt{2}, j\sqrt{2})$ $(1+j1,-1+j1) \rightarrow (0+j\sqrt{2}, \sqrt{2})$ $(1-j1,-1+j1) \rightarrow (0,\sqrt{2}-j\sqrt{2})$ $(-1+j1,-1-j1) \rightarrow (-\sqrt{2}, j\sqrt{2})$ $(-1-j1,-1-j1) \rightarrow (-\sqrt{2}-j\sqrt{2},0)$ $(1+j1,-1-j1) \rightarrow (0,\sqrt{2}+\sqrt{2}i)$ $(1-j1,-1-j1) \rightarrow (-j\sqrt{2}, \sqrt{2})$ $(-1+j1,1+j1) \rightarrow (0+j\sqrt{2}, -\sqrt{2})$ $(-1-j1,1+j1) \rightarrow (0,-\sqrt{2}-j\sqrt{2})$ $(1+j1,1+j1) \rightarrow (\sqrt{2}+j\sqrt{2},0)$ $(1-j1,1+j1) \rightarrow (\sqrt{2}, -j\sqrt{2})$ $(-1+j1,1-j1) \rightarrow (0,-\sqrt{2}+j\sqrt{2})$ $(-1-j1,1-j1) \rightarrow (-j\sqrt{2}, -\sqrt{2})$ $(1+j1,1-j1) \rightarrow (\sqrt{2}, j\sqrt{2})$ $(1-j1,1-j1) \rightarrow (\sqrt{2}-j\sqrt{2},0)$ A pre-coded constellation may be used to increase the diversity gain and coding gain of a fading channel. The pre-coded constellation takes N symbols from a constellation and produces other N symbols each of which is dependent on each of the input constellation symbols. Therefore, if pre-coded constellation symbols are used to transmit over a fading channel, then each input constellation symbol goes through N different fades, as a result of which, the diversity increases.

At 110, the LLR corresponding to each bit of the symbol is calculated, based on the expanded predetermined constellation. This is further explained below in conjunction with FIG. 3.

Figure 2A:
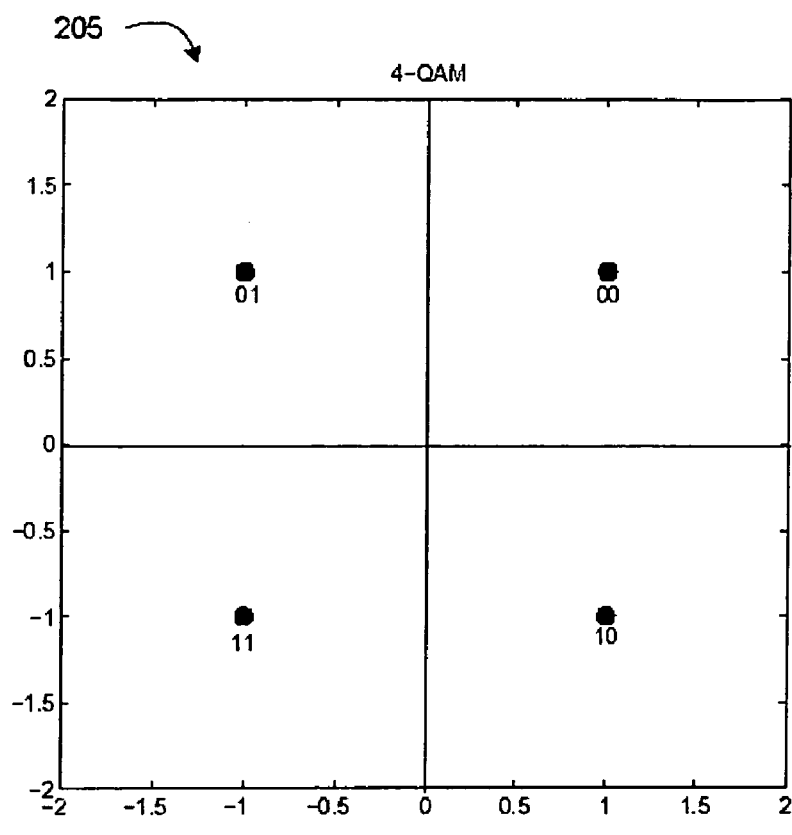
FIGS. 2A and 2B show a regular 4-Quadrature Amplitude Modulation (4-QAM) constellation, a rotated 4-QAM constellation and an expanded 4-QAM constellation, in accordance with an embodiment.
Figure 2A:
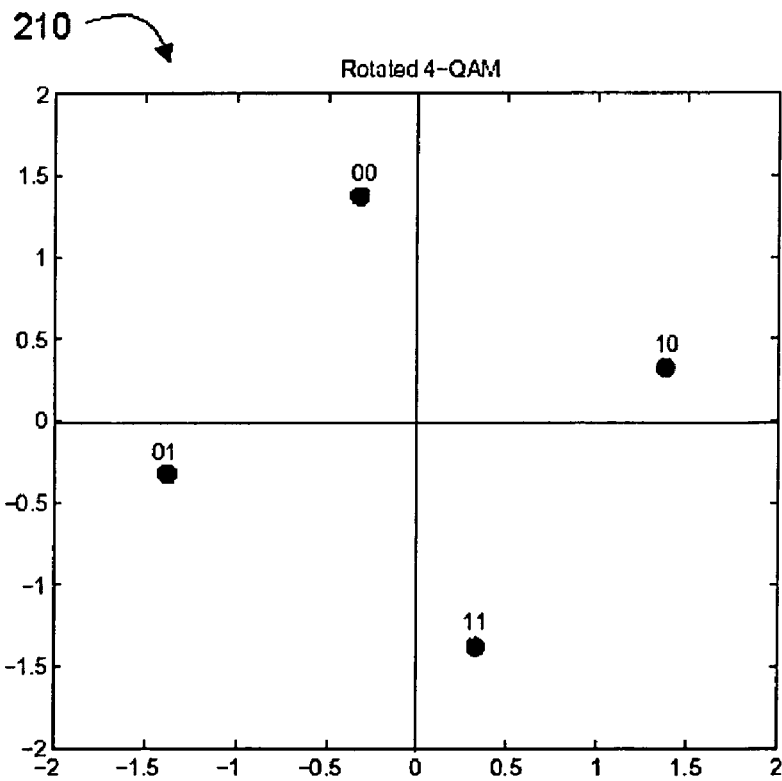
Figure 2B:
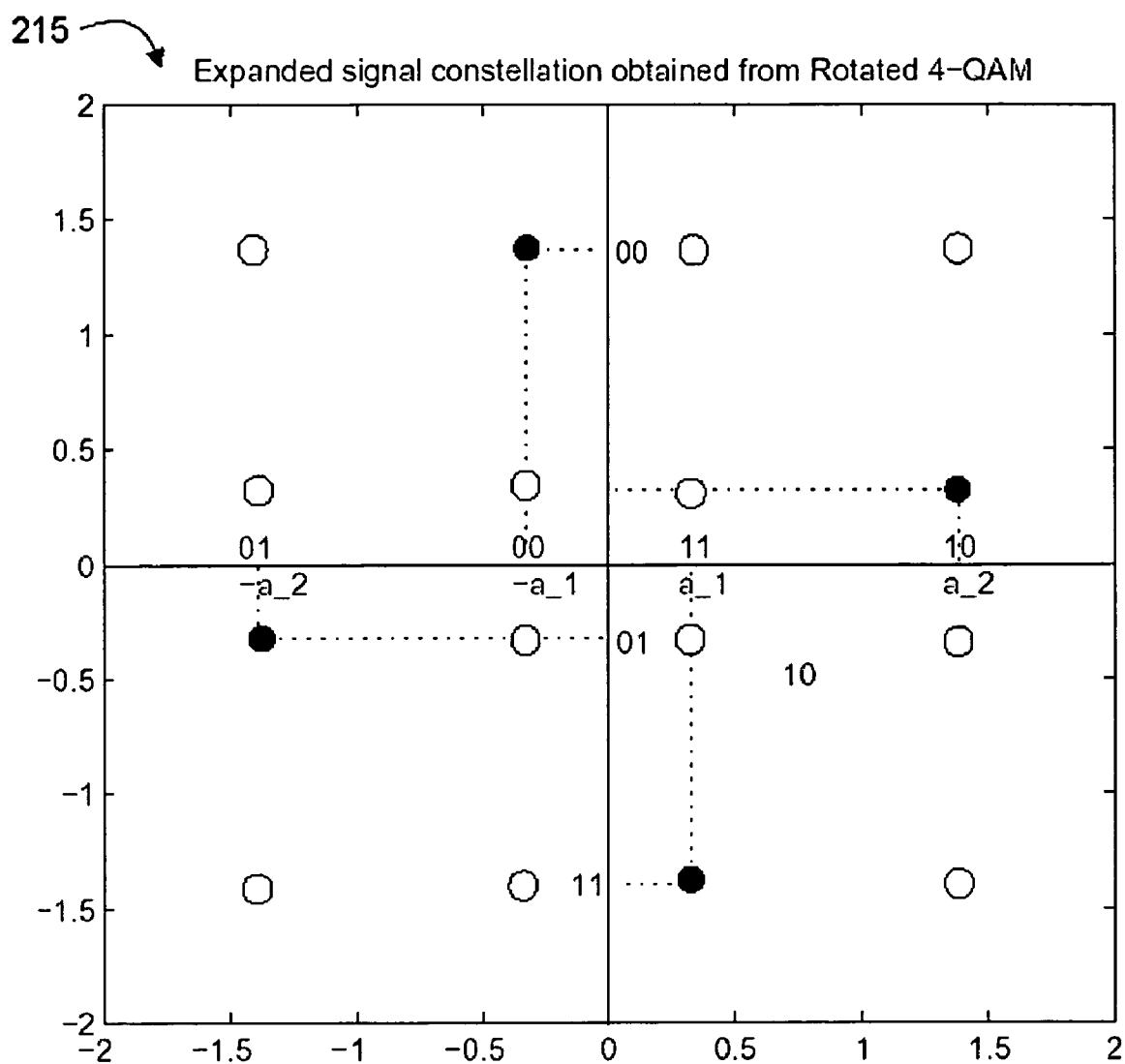

FIGS. 2A and 2B show a regular 4-QAM constellation 205, a rotated 4-QAM constellation 210 and an expanded 4-QAM constellation 215, in accordance with an embodiment. Regular 4-QAM constellation is rotated by a finite non-zero rotation to get rotated 4-QAM constellation 210. If rotated 4-QAM constellation 210 is expanded, constellation-points are extended along each quadrant along the x-axis and y-axis such that four expanded-constellation-bits are generated in each quadrant. As a result, 16 expanded-constellation bits are generated for each of the four quadrants as shown at expanded 4-QAM constellation 215.

Figure 3:
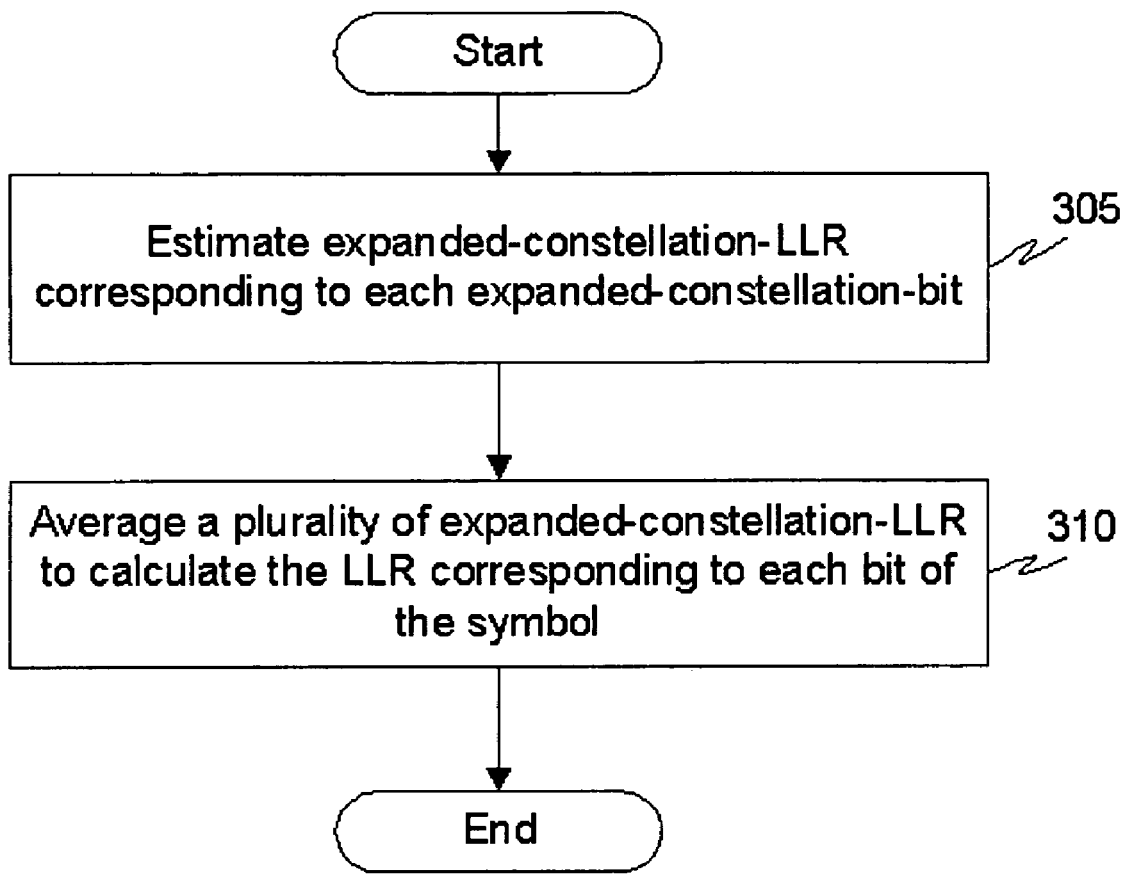
FIG. 3 is a flowchart for calculating the LLR corresponding to each bit of the symbol based on an expanded predetermined constellation, in accordance with an embodiment.

FIG. 3 is a flowchart for calculating the LLR corresponding to each bit of the symbol based on an expanded predetermined constellation, in accordance with an embodiment. At 305, expanded-constellation-LLR corresponding to each expanded-constellation-bit is estimated. In an embodiment, LLRs corresponding to the real part of constellation-point from the expanded 4-QAM constellation 215 are given as follows:

$$LLR(b_0) = \begin{cases} \text{sign}(y_R)n(m+y_R) & |y_R| > n \\ 8(n-m)y_R & \text{otherwise} \end{cases} \quad (1)$$

$$LLR(b_1) = \begin{cases} m(\text{sign}(y_R)n - y_R) & |y_R| > m \\ -8(n+m)y_R & \text{otherwise} \end{cases} \quad (2)$$

where, $n=(\alpha_2-\alpha_1)/2$ and $m=(\alpha_1+\alpha_2)/2$.

At 310, a plurality of expanded-constellation-LLRs are averaged to calculate the LLR corresponding to each bit of the symbol. For example, if the predetermined constellation is a rotated 4-QAM, the LLR corresponding to a first bit is an average of the expanded-constellation-LLR corresponding to a first expanded-constellation-bit and the expanded-constellation-LLR corresponding to a third expanded-constellation-bit. Similarly, the LLR corresponding to a second bit is an average of the expanded-constellation-LLR corresponding to a second expanded-constellation-bit and the expanded-constellation-LLR corresponding to a fourth expanded-constellation-bit.

Figure 4:
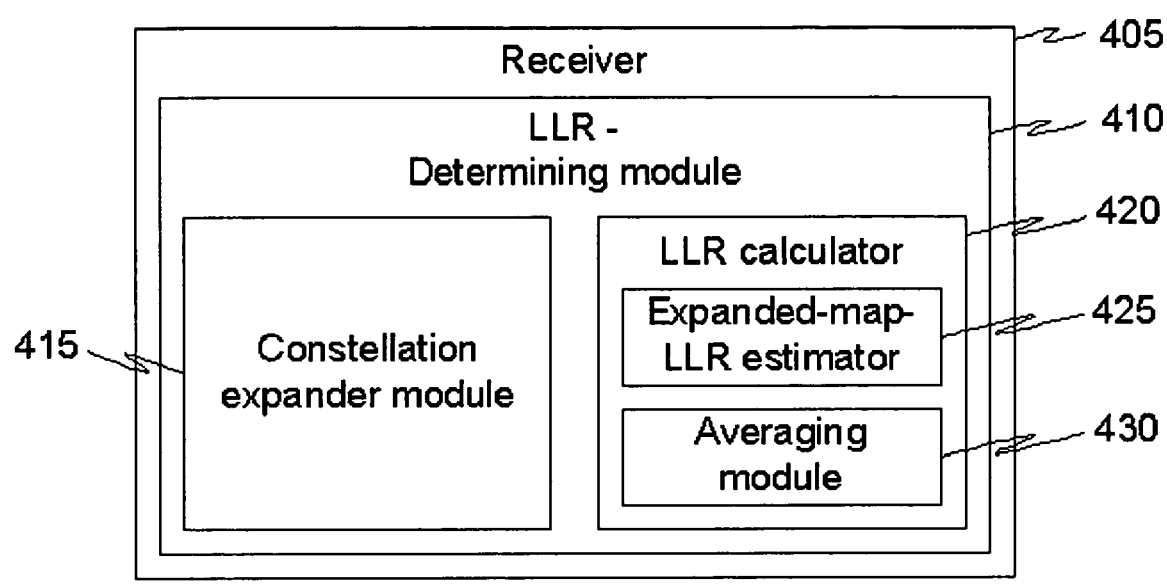
FIG. 4 is a block diagram of a receiver, in accordance with an embodiment.

FIG. 4 is a block diagram of a receiver 405, in accordance with an embodiment. Receiver 405 includes an LLR-determining module 410. In an embodiment, receiver 402 can further include a pre-coding module, if the predetermined constellation is pre-coded QAM constellation. The pre-coding module pre-codes a QAM constellation with unitary matrix.

LLR-determining module 410 is configured to determine a LLR corresponding to each bit of a symbol. The symbol includes a predefined number of bits based on a predetermined constellation. In various embodiments, the predetermined constellation includes a plurality of constellation-points. In an embodiment, the predetermined constellation is a rotated QAM constellation. In another embodiment, the predetermined constellation is a pre-coded QAM constellation. In various embodiments, LLR-determining module 410 includes and/or is coupled to a constellation expander module 415 and an LLR calculator 420, but is not so limited.

Constellation expander module 415 is configured to expand the predetermined constellation such that the expanded predetermined constellation includes each constellation-point of the predetermined constellation and points corresponding to each combination of the X co-ordinate and the Y co-ordinate of the constellation-points of the predetermined constellation.

LLR calculator 420 is configured to calculate the LLR corresponding to each bit of the symbol based on the expanded predetermined constellation. LLR calculator 420 of an embodiment includes an expanded-map-LLR estimator 425 and an averaging module 430, but may include other modules or components. Expanded-map-LLR estimator 425 is configured to estimate expanded-constellation-LLR corresponding to each expanded-constellation-bit. Averaging module 430 is configured to average a plurality of expanded-constellation-LLRs to calculate the LLR corresponding to each bit of the symbol.

In various embodiments, constellation expander module 415 and LLR calculator 420 can be integrated into a single module or distributed among any number of other modules of a system.

The various embodiments described herein provide a method and system in which the computations involved in determining an LLR are significantly reduced for a rotated QAM constellation and a pre-coded QAM constellation. For example, the number of comparisons required for two symbols is $4\log_2(|S|^2)$, in contrast to prior art methods where, the number of comparisons required for two symbols is $2|S|^2 - 4|S|$ (here $|S|$, is co-ordinality of S).

What is claimed is:

1. A method of a receiver determining a Log-Likelihood Ratio (LLR) corresponding to each bit of a symbol, the symbol comprising a predefined number of bits based on a predetermined constellation, the method comprising:
   a. the receiver expanding the predetermined constellation, the predetermined constellation comprising a plurality of constellation-points, each constellation-point having a unique X co-ordinate and Y co-ordinate, wherein the expanded predetermined constellation further comprises points corresponding to each combination of the X co-ordinate and the Y co-ordinate of the constellation-points; and
   b. the receiver calculating the LLR corresponding to each bit of the symbol based on the expanded predetermined constellation;
   wherein the X co-ordinate and the Y co-ordinate of a pair of constellation-points are interleaved, wherein interleaving the X co-ordinate and the Y co-ordinate of the pair of constellation-points comprises forming a new interleaved first symbol, $x_0$, from a real component of a first complex symbol, $s_0$, and an imaginary component of a second complex symbol, $s_1$, and forming a new interleaved second symbol, $x_1$, from a real component of the second complex symbol, $s_1$, and an imaginary component of the first complex symbol, $s_0$;
   wherein the predetermined constellation is a pre-coded Quadrature Amplitude Modulation (QAM) constellation, wherein the constellation-points on the constellation of the pre-coded QAM constellation satisfy at least one predefined condition; and wherein the at least one predefined condition comprises the X co-ordinate of a symbol point selected from a first set and the Y co-ordinate of the symbol point selected from a second set wherein the second set is a complement of the first set.

2. The method of claim 1, wherein the predetermined constellation is a rotated Quadrature Amplitude Modulation (QAM) constellation.

3. The method of claim 2, wherein a pair of symbols is obtained by picking a pair of constellation-points from the rotated QAM constellation.

4. The method of claim 2, wherein a number of expanded-constellation-bits is equal to twice the predefined number of bits.

5. The method of claim 1, wherein a number of expanded-constellation-bits is equal to a product of the predefined number of bits and number of pre-coded constellation-points.

6. The method of claim 1, wherein the at least one predefined condition comprises a first constellation-point that is equal to a complex conjugate of a second constellation-point.

7. The method of claim 1, wherein the at least one predefined condition comprises a first constellation-point that is a equal to a negative complex conjugate of a second constellation-point.

8. The method of claim 1, wherein calculating the LLR corresponding to each bit of the symbol based on the expanded predetermined constellation comprises:
   a. estimating expanded-constellation-LLR corresponding to each expanded-constellation-bit; and
   b. averaging a plurality of expanded-constellation-LLRs to calculate the LLR corresponding to each bit of the symbol.

9. A receiver comprising:
a. a Log-Likelihood Ratio (LLR)-determining module, the LLR-determining module configured to determine a LLR corresponding to each bit of a symbol, the symbol comprising a predefined number of bits based on a predetermined constellation, the LLR-determining module comprising:
   i. a constellation expander module, the constellation expander module configured to expand the predetermined constellation, the predetermined constellation comprising a plurality of constellation-points, each constellation-point having a unique X co-ordinate and Y co-ordinate, wherein the expanded predetermined constellation further comprises points corresponding to each combination of the X co-ordinate and the Y co-ordinate of the constellation-points; and
   ii. an LLR calculator, the LLR calculator configured to calculate the LLR corresponding to each bit of the symbol based on the expanded predetermined constellation;
   wherein the X co-ordinate and the Y co-ordinate of a pair of constellation-points are interleaved, wherein interleaving the X co-ordinate and the Y co-ordinate of the pair of constellation-points comprises forming a new interleaved first symbol, $x_0$, from a real component of a first complex symbol, $s_0$, and an imaginary component of a second complex symbol, $s_1$, and forming a new interleaved second symbol, $x_1$, from a real component of the second complex symbol, $s_1$, and an imaginary component of the first complex symbol, $s_0$;
   wherein the predetermined constellation is a pre-coded Quadrature Amplitude Modulation (QAM) constellation, wherein the constellation-points on the constellation of the pre-coded QAM constellation satisfy at least one predefined condition; and wherein the at least one predefined condition comprises the X co-ordinate of a symbol point selected from a first set and the Y co-ordinate of the symbol point selected from a second set, wherein the second set is a complement of the first set.

10. The receiver of claim 9, wherein the LLR calculator comprises:
   a. an expanded-map-LLR estimator, the expanded-map-LLR estimator configured to estimate an expanded-constellation-LLR corresponding to each expanded-constellation-bit; and
   b. an averaging module, the averaging module configured to average a plurality of expanded-constellation-LLRs to calculate the LLR corresponding to each bit of the symbol.

11. The receiver of claim 9, wherein the constellation expander module and the LLR calculator are integrated into a single module.

12. The receiver of claim 9, wherein the predetermined constellation is a rotated Quadrature Amplitude Modulation (QAM) constellation.

13. The receiver of claim 12, wherein a pair of symbols is obtained by picking a pair of constellation-points from the rotated QAM constellation.

14. The receiver of claim 9, wherein the at least one predefined condition comprises a first constellation-point that is equal to a complex conjugate of a second constellation-point.

15. The receiver of claim 9, wherein the at least one predefined condition comprises a first constellation-point that is equal to a negative complex conjugate of a second constellation-point.

* * * * *